H. G. WEBSTER.
ELECTRICAL BATTERY CHARGING SYSTEM.
APPLICATION FILED APR. 18, 1912.

1,257,163.

Patented Feb. 19, 1918.
2 SHEETS—SHEET 1.

Witnesses:
G. E. Mueller
Wm. Berghahn

Inventor:
Harry G. Webster
By Curtis B. Camp
Attorney.

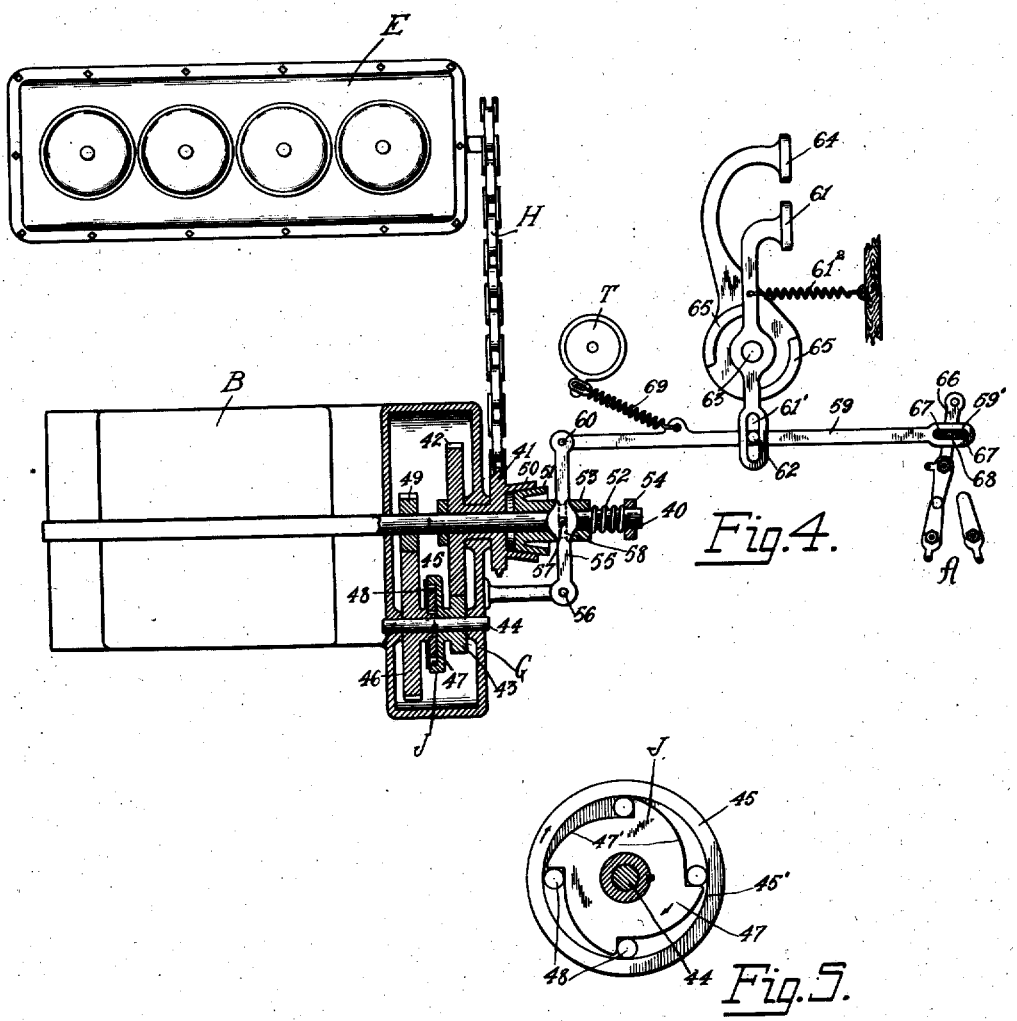

UNITED STATES PATENT OFFICE.

HARRY G. WEBSTER, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

ELECTRICAL BATTERY-CHARGING SYSTEM.

1,257,163.

Specification of Letters Patent. Patented Feb. 19, 1918.

Application filed April 18, 1912. Serial No. 691,653.

*To all whom it may concern:*

Be it known that I, HARRY G. WEBSTER, a citizen of the United States, residing in Chicago, county of Cook, State of Illinois, have invented certain new and useful Improvements in Electrical Battery-Charging Systems, of which the following is a specification.

My invention relates to electrical battery charging systems for use in connection with internal combustion engines, and is directed more particularly for use in connection with automobiles, an object of my invention being the provision of an improved and simplified circuit arrangement and controlling mechanism for systems of the character referred to.

My invention is directed more particularly to that character of system in which a motor dynamo is provided to act either as a motor to start the automobile engine, or as a generator while the automobile engine is running, to charge a set of storage batteries which are preferably provided for running the motor and for furnishing current to the ignition and lighting systems on the automobile.

For a better understanding of my invention, reference will be made to the accompanying drawings, in which like parts are indicated by like reference characters, and in which—

Fig. 4 shows an arrangement of a controlling mechanism; and

Fig. 5 illustrates more in detail a clutch arrangement of the mechanism of Fig. 4.

Figure 1:
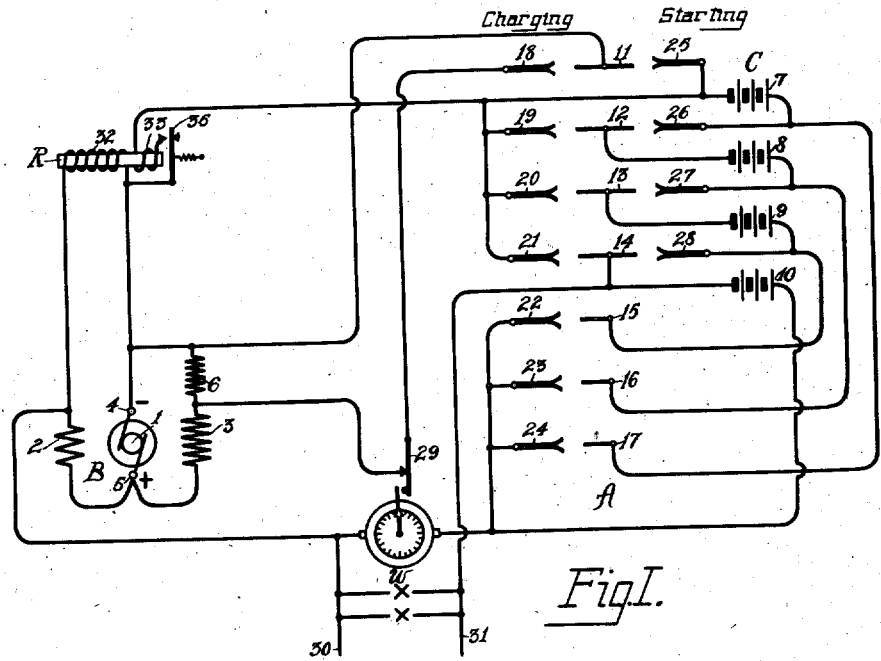
Figure 1 illustrates diagrammatically the preferred circuit arrangement of my invention, with the main controlling switch A in an intermediate position.

Referring now more particularly to the circuit arrangements, a motor generator B is provided, preferably of the compound winding short-shunt type, comprising an armature 1, a series field winding 2, and a shunt field winding 3. These windings 2 and 3 are so arranged upon the field coils that while the machine B is acting as a motor and current is provided from an external source for operating it, they act cumulatively upon the field magnets, but these coils 2 and 3 are so connected that when machine B is being driven as a generator, the current flowing through them acts differentially upon the field magnets. As is indicated in the drawings, coils 2 and 3 are preferably of a different number of turns and also of different resistance, the series field coil 2 being of comparatively low resistance and number of turns, while the shunt field coil 3 is of a greater resistance and number of turns, and it is to be understood that shunt coil 3 is the predominating one in the magnetization of the field magnets, when the machine is acting as a dynamo. The terminal 4 of machine B is preferably the negative terminal, while terminal 5 is the positive terminal, that is, when the machine is being operated as a motor positive current flows in at the positive terminal, and when acting as a generator positive current flows out of the machine at terminal 5. A resistance 6, is adapted to be connected in series with the shunt field 3 to increase the resistance of this shunt circuit and to cut down the energizing effect of shunt field winding 3.

Figure 2:
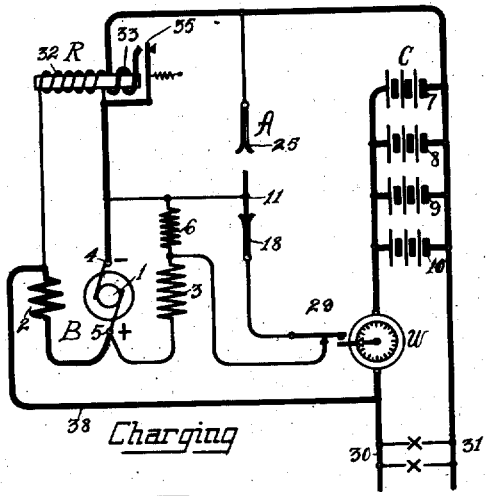
Fig. 2 is a more simplified arrangement of the circuit of Fig. 1, but with the switch A thrown into the charging position.
Figure 3:
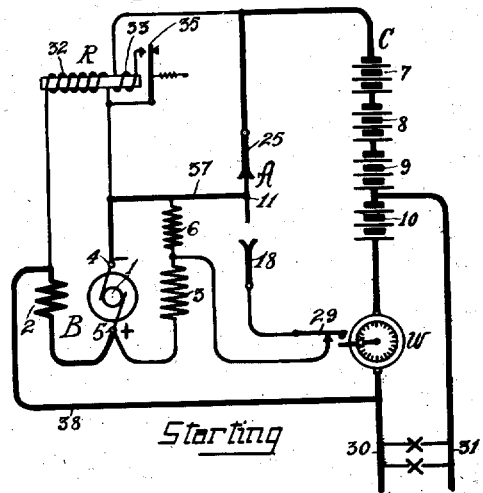
Fig. 3 is a simplified circuit arrangement with the switch A thrown into starting position.

A storage battery C is also provided, comprising sets of cells 7, 8, 9 and 10, which are adapted to be controlled by switch A to be preferably connected in multiple as shown in Fig. 2 for charging, or in series as shown in Fig. 3 when acting to turn the motor B for starting the engine.

Switch A is of a suitable snap-acting type, and is also preferably arranged so that the levers 11 to 17, inclusive, will be maintained either in the charging position in contact with switch contacts 18 to 24, inclusive, or in the starting position in connection with the switch contacts 25 to 28, inclusive. In Fig. 1, the movable switch arms 11 to 17 are shown in intermediate position, but it is to be understood, as previously stated, that the switch A is so arranged that it assumes either the charging or starting position as will be clear from an inspection of Fig. 4, and as will be hereinafter more particularly described.

Battery C is so connected with switch A that with the switch in starting position, the battery cells are connected in series as indicated in Fig. 3, and with the switch in charging position, the cells are connected in a series multiple circuit as in Fig. 2.

A watt meter W is also provided being of a well known type which is adapted, upon recording a predetermined charge, to act upon a pair of contact springs 29. That is, the meter is so arranged that when current is flowing through in one direction, for instance, to charge the storage battery C, its dial hand is operated to record the watts passed through the meter, and upon the meter indicating a definite charge, the contacts 29 are interrupted, this being effective to assist in stopping the charging of the battery, while with the current from battery C flowing back through meter W, the dial hand will of course move in the opposite direction to record the discharge of the batteries, whereby contacts 29 are again allowed to close, rendering the generator B effective to again act upon battery C. I preferably adjust contacts 29 to again close after a slight discharge of the batteries so they may be maintained practically fully charged.

Conductors 30, 31 are connected to battery C, and are adapted to lead to the lighting or ignition system of the automobile, or for any other use desired. It will be apparent from Figs. 2 and 3 that any current taken from the battery by the circuit 30, 31, must flow through watt meter W.

A control relay R is provided for coöperating in the control of charging battery C, being adapted after a predetermined charge of battery C, to interrupt the charging circuit. Relay R comprises a winding 32 of a comparatively high resistance thus operating with low current consumption, as it is preferably permanently connected across the terminals of the machine B. A second winding 33 is also provided, being preferably of low resistance as it is included in the charging circuit.

Normally switch A assumes the charging position creating the circuit arrangement of Fig. 2. Thus the cells of battery C are preferably connected in series multiple circuit and assuming they are partly discharged, contacts 29 are closed, and with switch contacts 11—18 closed, resistance 6 is short circuited so that generator B when running at charging speed produces a voltage sufficient to charge the battery.

When switch A is thrown to the starting position, the circuit arrangement illustrated in Fig. 3 is established with the cells of battery C in series and the switch arm 11 in connection with contact 25. It will be seen that with this arrangement, winding 33 of relay R is short circuited by contacts 11, 25, thereby also connecting the negative pole of battery C to terminal 4 of generator B. With the circuit in the starting condition as shown by Fig. 3, winding 32 of relay R is connected across the terminals of battery C causing the attraction of its armature and the closing of its contact 35, but this closing of contact 35 is without effect at this time due to winding 33 being short circuited by switch contacts 11—25.

Now when switch A is thrown from starting to charging establishing the circuit of Fig. 2, the engine may be running at slow speed and unless generator B is producing a high enough voltage to overcome the spring tension and maintain the armature of relay R attracted, said armature retracts interrupting contact 35, but as soon as the current from generator B reaches a high enough voltage to overcome the action of the spring tension, which voltage is of charging strength, the armature is again attracted closing contact 35 and establishing the charging circuit indicated by the heavy lines.

When the voltage of generator B drops to and below battery voltage, due to slowing down of the engine or any other cause, the back flow of current from the battery through winding 33 tends to neutralize the magnetic effect of winding 32, and the tension of contact spring 35 is such that the retraction of the armature is effected and of course the contact 35 interrupted. Of course as soon as the voltage is up to charging strength the armature is again attracted to close the charging circuit. As soon as a predetermined charge has been given to battery C, and which will be indicated by watt meter W, contact 29 thereof is interrupted, opening the direct shunt about the resistance 6, including it in series with the shunt winding 3, and thereby cutting down the current flow through this winding 3. As at this time the series and shunt windings 2, 3, are acting differentially upon the field magnets with winding 3 the predominating one, due to the inclusion of resistance 6, the magnetization of the field magnets is reduced and the voltage of generator B is cut down enough to allow the armature of relay R to be retracted thereby opening the charging circuit by the interruption of contacts 35.

When operating motor B to start the engine it is apparent that at times the engine will pick up and run on its own power before the operator releases the starting pedal and therefore the motor would be relieved of its load for a short period, but due to the shunt field winding on the motor it will not reach an excessive speed. Upon the starting of motor B, I include resistance 6 in series with shunt field winding 3, this additional resistance being effective to give more of a series motor characteristic to the machine but at the same time this resistance is not sufficiently high to allow an excessive speed thereof, the shunt winding 3 acting as a speed regulator.

In Figs. 4 and 5 I have illustrated mechanism for controlling the circuit of Fig. 1, and have indicated diagrammatically in connection therewith an automobile engine E connected to the gearing G preferably by means of a noiseless chain drive or link-belt H. The mechanism as illustrated in Figs. 4 and 5 is at normal. The motor-generator B is not shown in detail, and the shaft 40 is the shaft of motor generator B.

The gearing G which is adapted for connecting engine E and motor generator B, comprises a sprocket 41 and gear 42, preferably integral and loose upon shaft 40. A pinion 43 is rotatably supported on a shaft 44, said pinion 43 carrying a cup shaped clutch disk 45. A gear wheel 46 is also rotatably supported by shaft 44, said gear 46 carrying a cam 47 and positioned within the hollow of cup disk 45 with clutch rollers 48 inserted between the cam surfaces $47^1$ and the inner surface $45^1$ of cup 45. Clutch J is a well known device and further description thereof is deemed unnecessary.

A friction clutch is also provided for normally connecting sprocket 41 directly to shaft 40, said clutch comprising a pair of conical disks 50, 51, disk 50 being preferably integral with sprocket 41, while disk 51 is slidably keyed to shaft 40 in such a manner that it may be moved in and out of frictional engagement with disk 50. A helical spring 52 tends to normally hold disk 50 and 51 in engagement, said spring 52 being compressed between the hub 53 and collar 54. To slide disk 51 along shaft 40 a yoke member 55 is provided, being pivotally supported by pin 56 and extending upwardly around hub 53 and carrying a pair of pins 57 which extend into slot 58 in hub 53 (shown by dotted lines). A link bar 59 is pivotally connected by pin 60 to member 55, said bar being also connected to the starting pedal 61 through the medium of the roller 62 extending through slot $61^1$ of pedal 61. Pedal 61 is preferably supported upon the same shaft 63 which supports the usual clutch pedal 64. A pair of lateral projections 65 are provided for clutch pedal 64, being so arranged with respect to the starting pedal 61 that when pedal 61 is depressed, due to its engagement with projections 65, clutch pedal 64 is also carried along, thereby disengaging the engine from the driving shaft of the automobile in the usual manner. As the starting of motor B is effected by the operation of the starting pedal 61, it is apparent that with this connection between pedals 61 and 64 that the operator will be sure to have his engine transmission disconnected from the driving shaft so that it will be impossible to start the motor and thereby the engine, with the engine connected to the driving shaft of the automobile.

The starting pedal 61 also controls snap switch A, being connected therewith through the medium of connecting link 59 and lever 66. A slot $59^1$ in link 59 supports two helical springs 67, between which projects a pin 68 carried by lever 66. I have shown the movable contacts of switch A as being attached directly to lever 66, but it is to be understood that any suitable snap-acting switch may be used.

In order to be positive that the timer (indicated at T) is positioned to have the spark sufficiently retarded at the time of starting engine E to prevent back-firing I have preferably connected it to the starting pedal 61 through the medium of a spring connection 69, this connection being so arranged that when the starting pedal 61 is depressed spring 69 adjusts the timer as stated.

As previously pointed out machine B is adapted to act either as a motor to drive the engine E in starting it, or is adapted to be driven by engine E to act as a dynamo to charge the storage batteries, or provide current for any desired purpose. Therefore, the connection extending between engine E and machine B and which includes member H and gearing G, is so arranged that when engine E is driving machine B, said machine B is preferably revolved at engine speed, while with machine B acting as a motor it is desirable to have it operate at a speed comparatively greater than the engine. Thus it will be seen that with engine E driving motor B and with starting pedal 61 at normal, due to the frictional engagement between conical disks 50, 51 the belt H acts directly upon shaft 40, thereby revolving it at engine speed, the arrows shown in Figs. 4 and 5 indicating the direction of rotation of the different parts. It will be noted that with engine E and dynamo B directly connected through clutch members 50, 51 as referred to, pinion 43 being connected to gear 42, and gear 46 being connected to pinion 49, pinion 43 rotates a great deal faster than gear 46, the arrangement of clutch J allowing such operation and there is no interference between the two differently movable members 43, 46.

Now with the machine B acting as a motor to drive engine E, starting pedal 61 is fully depressed so that conical disks 50, 51 are out of frictional engagement, and therefore connection through gearing G extends from pinion 49 to gear 46 and then through clutch member J to pinion 43 which acts upon gear 42 whereby sprocket 41 acts to drive engine E at a relatively slowed speed, through the medium of member H.

*Operation.*

Having described more in detail the different elements and coöperation thereof, a more complete operation of the system will now be described.

Assuming that the system is at normal with the circuits arranged as in Fig. 2 and the mechanism at normal as in Fig. 4, and with battery C partly discharged, the operator depresses starting pedal 61, thus rotating it on shaft 63, and due to its engagement with clutch pedal 64, said pedal 64 is also carried along to disengage the engine from the driving shaft. This operation moves link 59 toward the right, thereby disconnecting clutch disk 51 from disk 50 so that the connection between engine E and motor B extends through gearing G. The said movement of link 59 also is effective to throw switch A to the right into the starting position, thereby bringing about a circuit arrangement as shown in Fig. 3, and also through the connection of member 69, timer T is operated to sufficiently retard the spark to prevent backfiring.

A circuit for motor B is thereby established from positive pole of battery C, watt meter W, conductor 38, series field winding 2, terminal 5, dividing at this point, part of the current flowing through armature 1 and part of the current flowing through shunt field winding 3 and resistance 6, conductor 37, switch contacts 11—25 to the negative pole of battery C.

Due to the closing of contacts 11—25 of switch A a circuit is also closed from battery C through winding 32 of relay R, whereby said relay is energized to close its contact 35, but this has no effect upon the operation of the system as yet. The said circuit for relay R is traced from positive pole of battery C, watt meter W, conductor 38, the winding 32 of relay R, conductor 37, and contacts 11—25 to negative pole of battery C.

The said battery circuit through motor B causes it to rotate its armature and through the medium of gearing G and linkbelt H, the engine E is rotated at a speed relatively slower than the motor.

It will be noted that when the starting circuit described is established, that resistance 6 is connected in series with shunt field winding 3 due to the interruption of switch contacts 11—18. It will be further noted that due to the connection 69 extending from link bar 59 to timer T, the spark has been sufficiently retarded to prevent backfiring, and the operator having previously operated the controlling levers, engine E will of course start to run on its own power.

The said driving connection which extends from motor B to engine E is traced from pinion 49 which is fastened to shaft 40, through gear 46, clutch J, pinion 43, gear 42, which is now free upon shaft 40, sprocket 41 and through the link-belt H to the main shaft of engine E.

Switch A having been thrown into the charging position, the circuit of Fig. 2 is established, but if the engine at this time has been driving generator B below charging speed its voltage is not sufficiently high to maintain the armature of relay R attracted so that said armature retracts interrupting contact 35, but as soon as generator B is driven to produce a charging voltage the armature of relay R is again attracted closing contact 35 and again establishing the charging circuit.

As soon as the operator hears that engine E is running on its own power, he releases the pressure upon starting pedal 61 allowing it to return to normal whereby clutch pedal 64 is also free to restore.

The restoration of starting pedal 61, due to the action of spring $61^2$, is effective to move link bar 59 toward the left whereby clutch cones 50, 51, are again brought into frictional engagement, being aided by the spring 52. The said restoring movement of bar 59 also is effective to throw the switch A from the starting to the charging position, while due to the engagement of clutch members 50, 51, engine E is connected directly to shaft 40 thereby driving generator B at engine speed. As this change takes place in the driving relation between engine E and machine B, gear 46 and pinion 43 are revolved by pinion 49 and gear 42 respectively, but due to clutch J and the relative size of the gears, gear 43 runs faster than 46 whereby clutch disk 45 frees itself of rollers 48 and cam 47.

With the machine B acting as a generator, series and shunt field windings 2 and 3 act differentially upon the field magnets with shunt winding 3 predominating, and the magnetization of the field magnets is of the same polarity as when the machine B was acting as a motor. Therefore, terminal 5 of generator B remains a positive terminal so that current will flow through series field 2, conductor 38, watt meter W, the four sets of cells 7, 8, 9, 10, winding 33 of relay R, contact 35 to terminal 4 of generator B. The winding 32 of relay R also being connected across the terminals of generator B, current will flow therethrough, the two windings 32, 33 acting cumulatively and contact 35 is maintained closed.

After a predetermined charge has been given to battery C, watt meter W will act to interrupt contact 29 whereby resistance 6 is connected in series with shunt winding 3, and as shunt winding 3 is the predominating field winding, due to the increase of resistance of this circuit, the amount of current flowing therethrough will be decreased, cutting down the field magnetization and thereby reducing the voltage of the generator B sufficiently to allow retraction of the armature and interruption of contact 35 as previously described. It will be noted that the charging circuit for battery C is directly through its contact 35 so that its interruption causes the interruption of the charging circuit, and due to the resistance 6 remaining in circuit with shunt field 3, the voltage of generator B is not sufficient to again cause an effective energization of relay R, until battery C is sufficiently discharged to again close contact 29.

As soon as battery C has been sufficiently discharged to cause watt meter W to again close contacts 29, resistance 6 being thereby short circuited, generator B immediately increases its voltage whereby the flow of current through winding 32 of relay R is sufficient to cause the attraction of its armature and the closing of its contact 35. Thus the charging circuit for battery C having been closed, the current from generator B again flows over the previously traced path until a sufficient charge to battery C has been given to again interrupt contacts 29, causing the same effect as before.

Assuming now that the engine is driving generator B, the charging circuit is closed and the operator shuts off the engine. As the engine slows down the generator of course slows down and its voltage decreases. As the voltage of the generator drops below the battery voltage there is an increasing flow from battery back through winding 35 relay R, this flow through winding 33 tending to neutralize the effect of the flow through winding 32 and increasing until the spring tension on the armature of relay R is sufficient to overcome the attraction of the core whereby the armature is retracted interrupting contact 35 and thereby interrupting the charging circuit.

Should the operator slow down the engine until the generator is running below charging speed, the back flow of current from C through winding 33 causes a retraction of its armature and the interruption of the charging circuit as where the engine was slowed down in stopping as last described, and as soon as the engine speeds up again thereby increasing the voltage of generator B to charging strength, relay R again attracts its armature closing its contact 35 and again establishing a charging circuit.

Throughout the specification and claims I have referred to the element 6 as a resistance and as a winding and I contemplate using this element either as an ordinary ohmic resistance or associating it with shunt field winding 3 and connecting it in such a manner that current flowing through it will tend to oppose the magnetizing effect of shunt winding 3 upon the field magnets.

While I have disclosed a particular application and arrangement of my invention, changes and modifications thereof will be apparent to those skilled in the art, and therefore I do not desire to be limited to the exact structure as shown and described, and I aim to cover all such changes and modifications as come within the spirit and scope of the appended claims.

What I claim as new and desire to secure by United States Letters Patent is:

1. A system of the character described comprising a dynamo having shunt and series field windings, the shunt field winding being permanently connected in its circuit, a storage battery in charging circuit therewith, a third winding in circuit relation with said shunt field winding, a manual switch included in a shunt circuit about said third winding, means responsive to a predetermined charge of said battery to effect said shunt circuit thereby effecting the circuit relation between said shunt and third windings to produce a change in voltage in said dynamo, and means responsive to such change in voltage to interrupt said charging circuit.

2. A system of the character described comprising a dynamo having shunt and series field windings, an accumulator in charging circuit therewith, a third winding, a manually operated switch and an automatically operated switch included in a shunt circuit about said third winding, means for operating said manually operated switch thereby causing said accumulator to be included in charging circuit with said dynamo, means for operating said automatically operated switch thereby including said third winding in circuit with one of said field windings, and means responsive to such inclusion of said third winding to interrupt said charging circuit.

3. A system of the character described comprising a compound dynamo, a storage battery in charging circuit therewith, a third winding, a manually operated switch contact and an automatically operated switch contact included in a short circuit about said winding, means for closing said manually operated contact thereby closing said short circuit, means for opening said automatically operated contact thereby effectively including said winding in circuit with one of the field windings, and means responsive to such inclusion to cause the interruption of said charging circuit.

4. A system of the character described comprising a dynamo-electric machine having shunt and series field windings, an accumulator in charging circuit therewith, a third winding connected in circuit with said shunt field winding, manually operated contacts and automatically operated contacts included in a short circuit about said third winding, means for closing said manually operated contacts when said dynamo-electric machine is operating as a generator thereby closing said short circuit and causing said generator to be included in circuit with said accumulator, means responsive to a predetermined charge of said battery to operate said automatically operated contacts thereby opening said short circuit, and means responsive to said last circuit change to open said charging circuit.

5. A system of the character described comprising a dynamo-electric machine having series and shunt field windings, a storage battery in charging circuit therewith, a third winding in circuit relation to said shunt field winding, a manual switch included in a short circuit about said third winding, means responsive to a predetermined charge of said battery to effect said short circuit thereby affecting the circuit relation between said shunt and third windings to produce a change in voltage of said machine when operating as a generator, and means responsive to such change to interrupt said charging circuit.

6. A system of the character described comprising a dynamo having shunt and series field windings, an accumulator in charging circuit therewith, a third winding normally connected in series circuit with said shunt winding, a manual switch adapted to close a short circuit about said third winding thereby closing said charging circuit, other contacts included in said short circuit about said third winding, and means responsive to a predetermined charge of the accumulator to operate said last contacts thereby including said winding in circuit with said shunt winding, and means responsive to said last circuit change to interrupt the said charging circuit.

7. A system of the character described comprising a compound dynamo having shunt and series field windings, an accumulator in charging circuit therewith, a third winding normally connected in series with the said shunt winding, a manual switch for closing a short circuit about said third winding, automatically operated switch contacts also included in said short circuit, means responsive to a predetermined charge of said battery whereby said automatically operated contacts are operated to interrupt said short circuit to include said winding in effective circuit with said shunt winding thereby causing a decrease in the voltage of said dynamo, and means responsive to said decrease to interrupt said charging circuit.

Signed by me at Chicago, county of Cook and State of Illinois, in the presence of two witnesses.

HARRY G. WEBSTER.

Witnesses:
WILLIAM M. COPELAND,
GEORGE E. MUELLER.